UNITED STATES PATENT OFFICE.

HERBERT C. DORR, OF SAN FRANCISCO, CALIFORNIA, ASSIGNOR TO THE DORR PAINT COMPANY, OF SAME PLACE.

MIXED PAINT.

SPECIFICATION forming part of Letters Patent No. 331,383, dated December 1, 1885.

Application filed March 31, 1884. Serial No. 126,237. (Specimens.)

*To all whom it may concern:*

Be it known that I, HERBERT C. DORR, a a citizen of the United States, residing at San Francisco, in the county of San Francisco and State of California, have invented a new and useful Composition of Matter to be used as a Paint, of which the following is a specification.

The compound which I employ is composed of certain ingredients in about the proportions and applied in the manner hereinafter explained.

I take of a product obtained from the distillation of coal-tar known in the arts as the "oil of tar" or "dead-oil," one gallon, and heat it to about 150° Fahrenheit, and mix with it when in a heated state one pound of gum-shellac, or one-fourth (¼) pound each of gum-shellac, Burgundy pitch, gum-copal, and one pound of gum-zanzibar. The gums should be pulverized and then intimately mixed with the dead-oil while hot, which acts as a solvent or menstruum for the gums. I then take of calomel three pounds, and ground gypsum an equal quantity in bulk to that of the calomel, and triturate the same together in a mortar, and mix them with the melted gum and dead-oil above described. By this union or by uniting the calomel with the gypsum a powerful detergent is formed, which is destructive to and a preventive of all living formations liable to foul the bottoms of ships. To this compound any of the pigments may be added to obtain the desired color and consistence.

In order to quickly dry the paint and produce a hard and enameled surface, I employ heat, which may be applied in various ways, such as a flame or jet of gas, naphtha flame from a painter's blast-lamp, red-hot irons, steam, or boiling water, the latter—the steam or boiling water—to be applied directly to the surface, while the hot-iron is only to be passed near the surface of the newly-painted parts. The best heat of all which I have found, however, is hot-air applied through a suitable tube directed against or over the painted surfaces.

The action of the heat or fire expels or drives off the volatile matter and leaves the gums and oil to form an enamel on the surface of the paint, which is much harder than the paint or surface would be if allowed to dry in the natural or usual way, and this glazed surface will resist the friction of the sea-water upon it, and retain the anti-fouling properties contained in the paint for a long time.

It will thus be seen that any wooden, iron, or steel ship can be covered with the enameling paint in a very short time, and successive applications or coats made and dried one after another, and the vessel be got ready for sea at once and without loss of time, so common in using other marine paints.

It should here be observed that my paint compound can be used without the application of heat, and be allowed to dry and harden in the usual manner, if desired.

Having thus described my invention, what I claim and desire to secure by Letters Patent, is—

The herein-described composition of matter to be used as a ship's paint, consisting of the oil of tar, gum-shellac, calomel, and gypsum, in about the proportions specified.

In testimony that I claim the foregoing I have hereunto set my hand and seal.

HERBERT C. DORR. [L. S.]

Witnesses:
C. W. M. SMITH.
W. P. COLEMAN.